United States Patent
Lin et al.

(10) Patent No.: US 8,235,336 B2
(45) Date of Patent: Aug. 7, 2012

(54) VACUUM SUCTION BASE

(75) Inventors: Ze-Bo Lin, Shenzhen (CN); Jian-Hui Dai, Shenzhen (CN); Shou-Ji Liu, Shenzhen (CN); Te-Sheng Jan, Taipei Hsien (TW); Yu-Tao Chen, Taipei Hsien (TW); Chun-Che Yen, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/818,121

(22) Filed: Jun. 17, 2010

(65) Prior Publication Data

US 2011/0226923 A1  Sep. 22, 2011

(30) Foreign Application Priority Data

Mar. 17, 2010  (CN) .......................... 2010 1 0126419

(51) Int. Cl.
*A45D 42/14* (2006.01)
*F16B 47/00* (2006.01)

(52) U.S. Cl. ................ 248/205.5; 248/206.2; 248/309.3

(58) Field of Classification Search .................. 248/683, 248/205.5, 205.7, 206.3, 309.3, 467
See application file for complete search history.

(56) References Cited

U.S. PATENT DOCUMENTS

| | | | | |
|---|---|---|---|---|
| 5,065,973 | A * | 11/1991 | Wang | 248/362 |
| 7,387,284 | B2 * | 6/2008 | Chang | 248/206.5 |
| 2005/0205744 | A1 * | 9/2005 | Singh | 248/351 |
| 2006/0027720 | A1 * | 2/2006 | Wu et al. | 248/205.5 |
| 2010/0282930 | A1 * | 11/2010 | Hsu | 248/205.5 |
| 2011/0024587 | A1 * | 2/2011 | Tsai | 248/206.2 |

FOREIGN PATENT DOCUMENTS

| | | |
|---|---|---|
| CN | 101504029 A | 8/2009 |
| GB | 2420147 A | 5/2006 |

* cited by examiner

*Primary Examiner* — Amy Sterling
*Assistant Examiner* — Erin W Smith
(74) *Attorney, Agent, or Firm* — Altis Law Group, Inc.

(57) ABSTRACT

A vacuum suction base includes a base, a fixing mechanism secured on the base, an adjusting cam, and an adjusting bolt. The base includes a suction piece and a column extending upwardly from the center of the suction piece. The fixing mechanism includes a column housing resisting an edge of the suction piece, and a sleeve connected to the column and defining a through hole. The adjusting cam is rotatably installed in the through hole and partially extends out from the through hole. One end of the adjusting bolt is fixed in the adjusting cam and the other end is engaged in the column.

18 Claims, 5 Drawing Sheets

VACUUM SUCTION BASE

BACKGROUND

1. Technical Field

The present disclosure relates to vacuum suction bases and, more particularly, to a vacuum suction base being able to adjust the suction force.

2. Description of Related Art

Usually, a vacuum suction base includes a base defining a cavity and a suction piece mounted on the bottom of the base. After the vacuum suction base is put on a smooth surface, users manipulate the suction piece until all the air in the cavity of the base is removed from the cavity, and the periphery of the suction piece is tightly contacted with the surface. A substantial vacuum space is generated between the surface and the suction piece, thus the vacuum suction base is absorbed on the surface. However, the suction force of the vacuum suction base is usually not adjustable.

Therefore, what is needed is a vacuum suction base with suction adjusting function alleviating the limitations described above.

DETAILED DESCRIPTION

Figure 1:
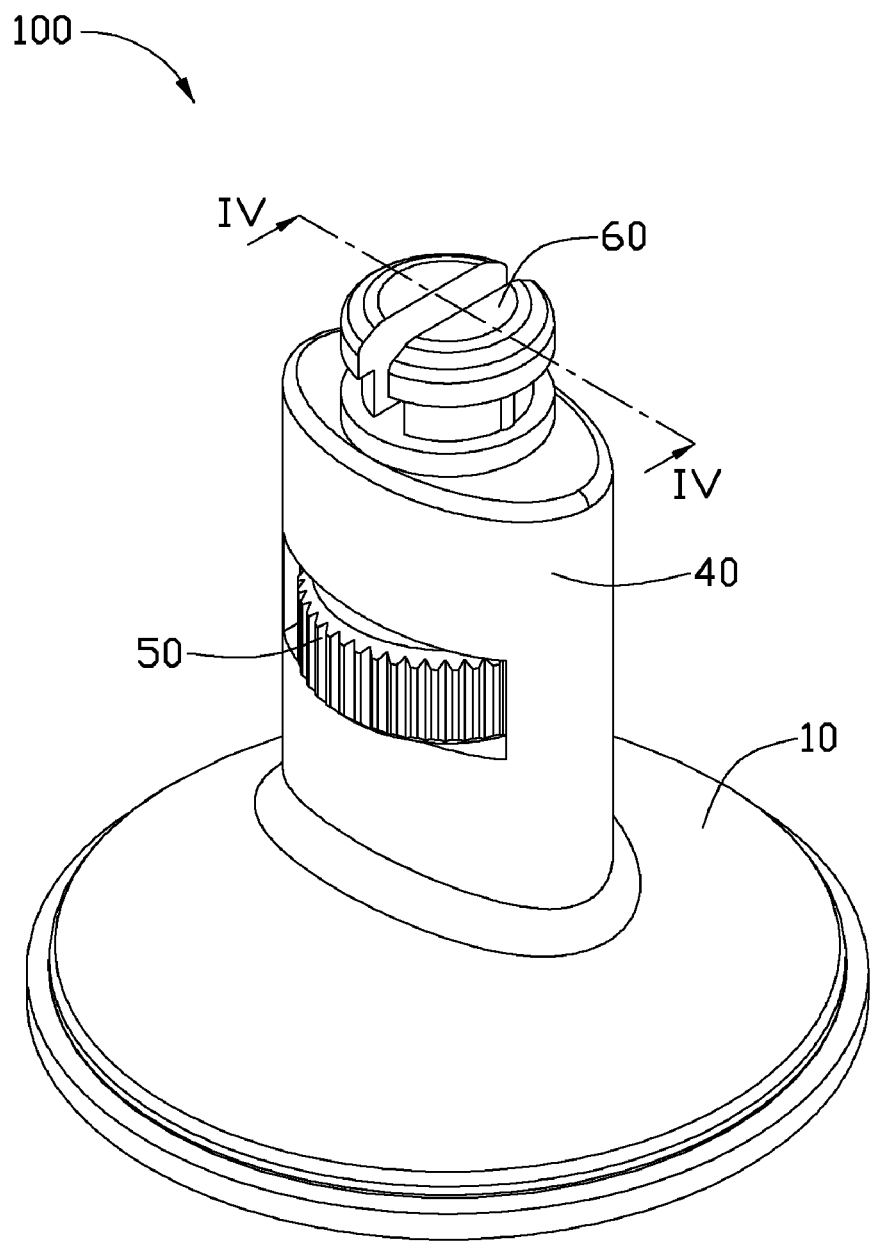
FIG. 1 is an isometric view of an exemplary embodiment of a vacuum suction base being able to adjust suction force.

Referring to FIG. 1, a vacuum suction base 100 is illustrated as an exemplary embodiment. The vacuum suction base 100 includes a base 10, a fixing mechanism 40 secured on the base 10, an adjusting cam 50 rotatably fixed on the fixing mechanism 40, and a fixing cap 60 allocated on the top of the fixing mechanism 40.

Figure 2:
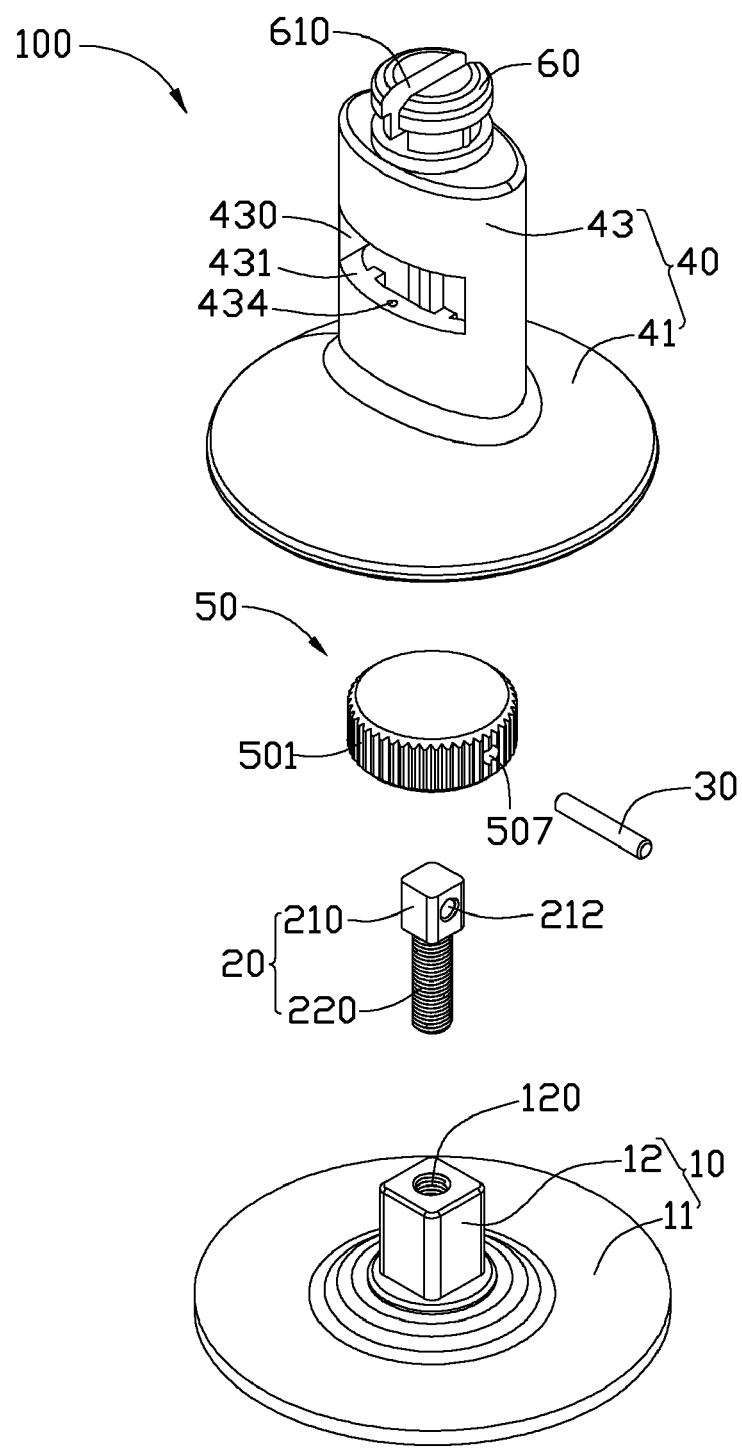
FIG. 2 is an exploded view of the vacuum suction base of FIG. 1.

Referring to FIG. 2, the base 10 includes a disk-shaped suction piece 11, and a column 12 extending upwardly from the centre of the suction piece 11. The suction piece 11 is made up of soft materials and has good sealing performance. A threaded bolthole 120 is defined in the column 12.

The vacuum suction base 100 further includes an adjusting bolt 20 and a pin 30. The adjusting bolt 20 includes a fixing element 210 and a bolt spindle 220 connected to the fixing element 210. The fixing element 210 defines a first pin hole 212. The bolt spindle 220 is a threaded cylinder. The bolt spindle 220 engages with the bolt threads of the threaded bolthole 120.

The fixing mechanism 40 includes a column housing 41 and a sleeve 43 connected to the column housing 41. The peripheral edge of the column housing 41 is substantially the same size, and shaped, as the suction piece 11 for resisting the edge of the suction piece 11. The sleeve 43 is elliptical in cross section and defines a through hole 430 for receiving the adjusting cam 50. Two bulges 434 symmetrically protrude from a bottom wall 431 of the through hole 430. The bulges 434 are allocated at the middle of the bottom wall 431. In other embodiments, the number of the bulges 434 may be only one or more than two. The fixing cap 60 extends upward from the upper surface of the sleeve 43, and defines a groove 610 for connecting and fixing a supported subject (not shown).

The adjusting cam 50 is a cylindrical disc, and defines an axially receiving hole 505 for receiving the fixing element 210. The adjusting cam 50 is installed in the through hole 430 and part of the adjusting cam 50 extends out from the through hole 430 for receiving external manipulation. Plurality of grooves 501 are defined on the circumference of the adjusting cam 50 with proportional spacing.

Figure 3:
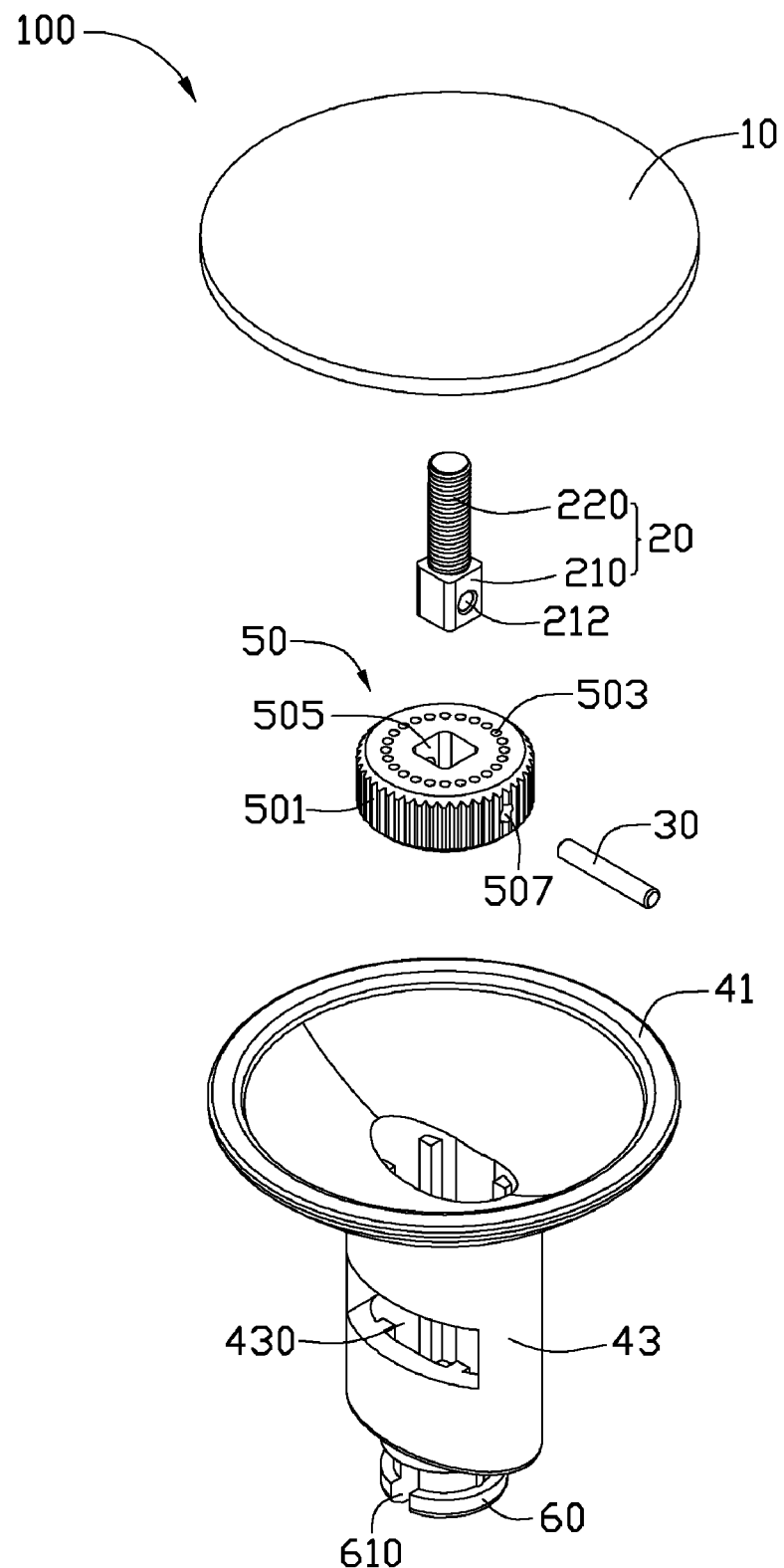
FIG. 3 is another exploded view of the vacuum suction base of FIG. 1, viewing from a different perspective.

Referring also to FIG. 3, plurality of recesses 503 are formed in the bottom surface of the adjusting cam 50. At least one bulges 434 can be received in the recesses 503. The recesses 503 are arranged along the circumference of a circle uniformly. The adjusting cam 50 further defines a radial second pin hole 507. The pin 30 extends from the second pin hole 507 to the first pin hole 212, thus to secure the adjusting bolt 20 to the adjusting cam 50.

In assembly, the base 10 is placed on a smooth surface 300. The bolt spindle 220 of the adjusting bolt 20 is engaged with the column 10. The first pin hole 212 is adjusted to be aligned with the through hole 430 of the sleeve 43. The adjusting cam 50 extends through the through hole 430 and is supported by the bottom wall 431 of the sleeve 43. The fixing mechanism 40 is sleeved on the base 10, and the fixing element 210 is received in the receiving hole 505. The adjusting cam 50 and the fixing mechanism 40 are rotated to define the through hole 430, the first pin hole 212 and the second pin hole 507 collinear. The pin 30 extends in sequence, through the through hole 430, the second pin hole 507, and the first pin hole 212. Thus, the adjusting bolt 20 is secured in the adjusting cam 50. When the adjusting cam 50 is rotated clockwise or counterclockwise, the adjusting cam 50 drives the adjusting bolt 20 to rotate, and the adjusting bolt 20 drives the column 12 to move along the bolt spindle 220 up or down.

Figure 4:
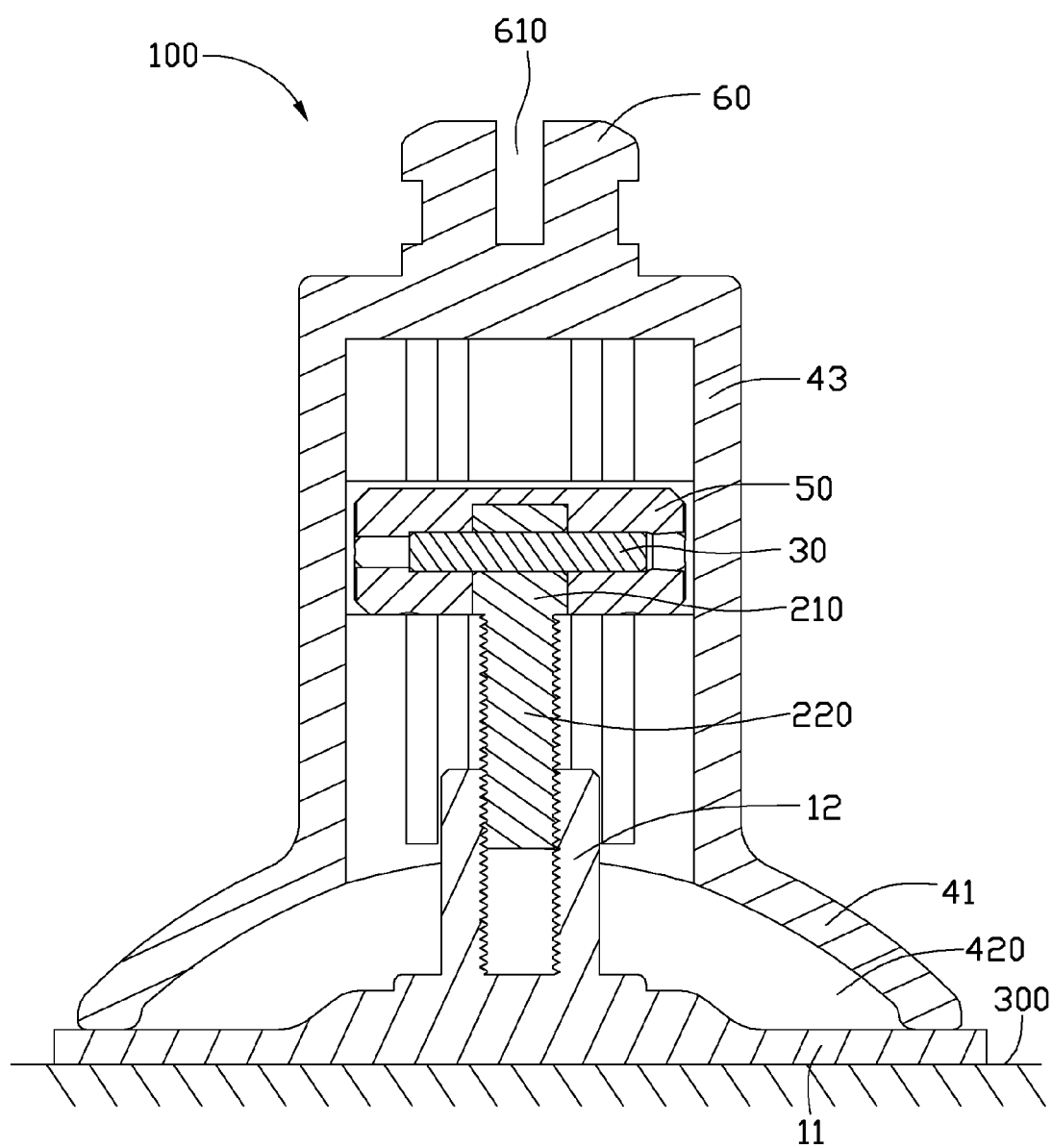
FIG. 4 is a cross-sectional view of the vacuum suction base of FIG. 1, taken along the line of IV-IV, showing the base of the vacuum suction base in a first position.
Figure 5:
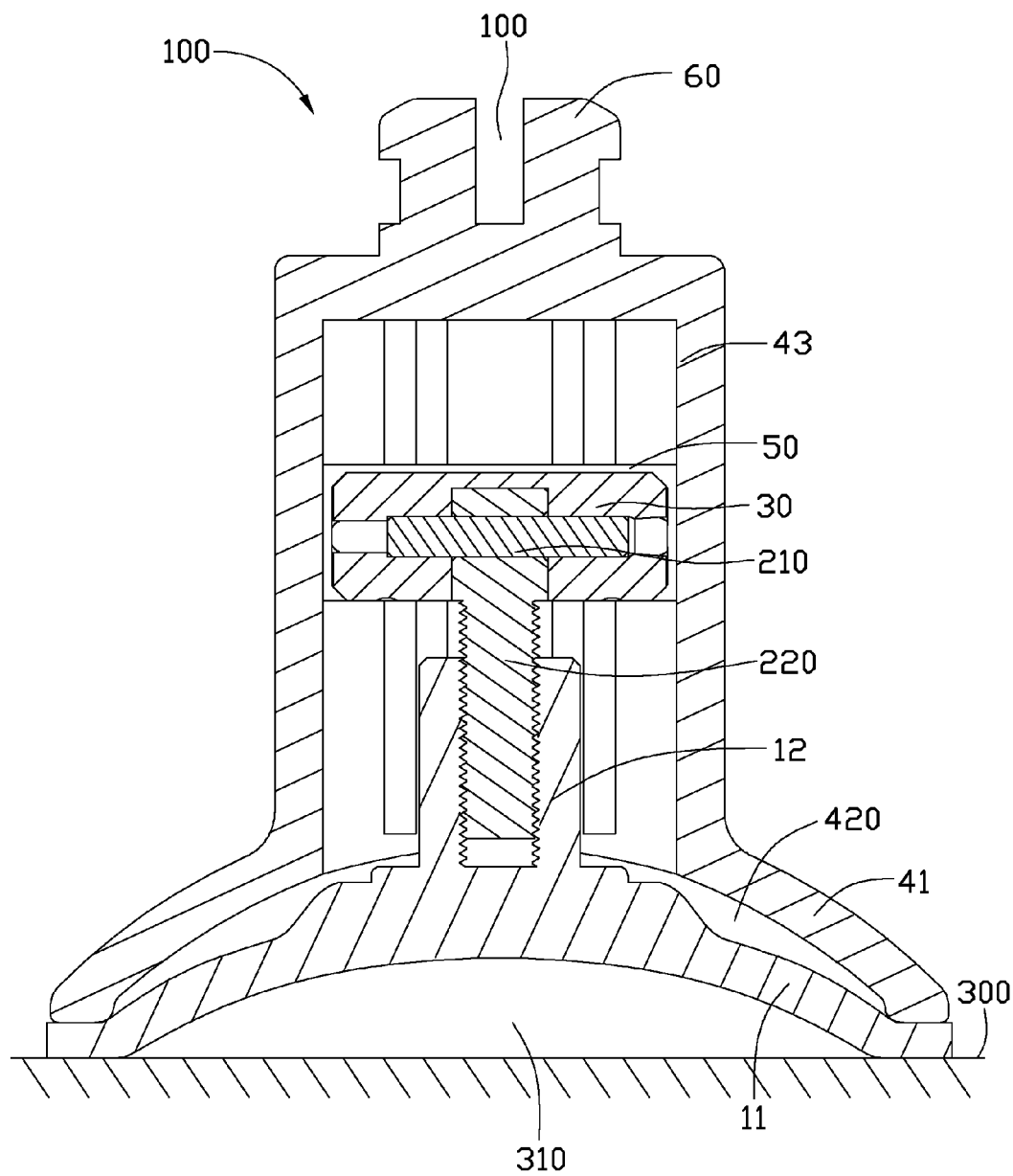
FIG. 5 is another cross-sectional view of the vacuum suction base of FIG. 1, similar to FIG. 4, but showing the vacuum suction base in a second position.

Referring to FIG. 4, in use, the vacuum suction base 100 is put on the smooth surface 300. The bolt spindle 220 engages with the end of the column 12 away from the suction piece 11. The upper surface of the suction piece 11 is smooth and tightly contacts the smooth surface 300. A large gap 420 is formed between the column housing 41 and the suction piece 11. The periphery edge of the column housing 40 resists on the suction piece 11.

When needed, the adjusting cam 50 is rotated clockwise, and the adjusting bolt 20 is rotated accordingly. The column 12 is driven to move upward along the bolt spindle 220. The center of the suction piece 11 is driven to detach from the smooth surface 300 and moved upward to form vacuums between the suction piece 11 and the smooth surface 300. Thus the suction space 310 is generated between the vacuum suction base 100 and the smooth surface 300. The suction force gradually increases along with decreasing of the space of the gap 420. When the suction force is proper, the adjusting cam 50 is rotated to drive the bulges 434 to be received in one or more of the recesses 503, thus the adjusting cam 50 is blocked on the sleeve 43 by the recesses 503. Accordingly, the vacuum suction base 100 is engaged on the smooth surface 300.

When unloading, the adjusting cam 50 is rotated counterclockwise to drive the adjusting bolt 20 to rotate in reverse The column 12 moves downward along the bolt spindle 220. In addition to the suction of the vacuum between the suction piece 11 and the smooth surface 300, and the gravitation of the base 10, the column 12 moves faster downward. Until the vacuum has been eliminated, the vacuum suction base 100 can be easily detached from the smooth surface 300.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A vacuum suction base comprising:
    a base comprising a suction piece, and a column defining a threaded bolt-hole and extending upwardly from the center of the suction piece;
    a fixing mechanism secured on the base, comprising:
        a column housing, the peripheral edge of which resisting an edge of the suction piece; and
        a sleeve connected to the column housing and defining a radial through hole;
    an adjusting cam defining an axial receiving hole and rotatably installed in the through hole and partially extending out from the through hole; and
    an adjusting bolt comprising a fixing element received in the receiving hole and a bolt spindle engaged in the threaded bolt-hole.

2. The vacuum suction base as described in claim 1, wherein the suction piece is made up of a soft material and is configured to absorb the vacuum suction base.

3. The vacuum suction base as described in claim 1, wherein the sleeve is elliptical in cross section, and the adjusting cam is a cylindrical disc.

4. The vacuum suction base as described in claim 1, wherein the number of the at least one bulge is two, the two bulges are allocated at the middle of the bottom wall symmetrically, and the recesses are arranged along a circumference of a circle uniformly.

5. The vacuum suction base as described in claim 1, wherein the vacuum suction base further comprises a pin, the fixing element defines a first pin hole, the adjust cam further defines a radial second pin hole, and the pin extends from the second pin hole to the first pin hole.

6. The vacuum suction base as described in claim 1, wherein the suction piece is disk-shaped.

7. The vacuum suction base as described in claim 6, wherein the peripheral edge of the column housing is substantially the same size and shaped as the suction piece.

8. The vacuum suction base as described in claim 1, wherein plurality of grooves protrude from the circumference of the adjusting cam.

9. The vacuum suction base as described in claim 1, wherein the vacuum suction base further comprise a fixing cap, the fixing cap extends upward from the upper surface of the sleeve, and defines a groove for connecting and fixing a supported subject.

10. A vacuum suction base comprising:
    a base comprising a suction piece;
    a column defining a threaded bolt-hole and extending upwardly from the center of the suction piece;
    a column housing, the peripheral edge of which resisting an edge of the suction piece;
    a sleeve connected to the column housing and defining a radial through hole, at least one bulge protruding from a bottom wall of the through hole;
    an adjusting cam defining an axial receiving hole and rotatably installed in the through hole and partially extending out from the through hole, a plurality of recesses being formed in the bottom surface of the adjusting cam, and the at least one bulge being capable of receiving in the recesses; and
    an adjusting bolt comprising a fixing element received in the receiving hole and a bolt spindle engaged in the threaded bolt-hole.

11. The vacuum suction base as described in claim 10, wherein the suction piece is made up of a soft material and is configured to absorb the vacuum suction base.

12. The vacuum suction base as described in claim 10, wherein the sleeve is elliptical in cross section, and the adjusting cam is a cylindrical disc.

13. The vacuum suction base as described in claim 10, wherein the number of the at least one bulge is two, the two bulges are allocated at the middle of the bottom wall symmetrically, and the recesses are arranged along a circumference of a circle uniformly.

14. The vacuum suction base as described in claim 10, wherein the vacuum suction base further comprises a pin, the fixing element defines a first pin hole, the adjust cam further defines a radial second pin hole, and the pin extends from the second pin hole to the first pin hole.

15. A vacuum suction base comprising:
    a base comprising a suction piece;
    a column defining a threaded bolt-hole and extending upwardly from the center of the suction piece;
    a column housing, the peripheral edge of which resisting an edge of the suction piece;
    a sleeve connected to the column housing and defining a radial through hole;
    an adjusting bolt comprising a fixing element defining a first pin hole and a bolt spindle engaged in the threaded bolt-hole;
    an adjusting cam defining an axial receiving hole and a radial second pin hole, and rotatably installed in the through hole and partially extending out from the through hole, a plurality of recesses being formed in the bottom surface of the adjusting cam, and the at least one bulge capable of being received in the recesses, the fixing element being received in the axial receiving hole; and
    a pin extending from the second pin hole to the first pin hole.

16. The vacuum suction base as described in claim 15, wherein the suction piece is made up of a soft material and is configured to absorb the vacuum suction base.

17. The vacuum suction base as described in claim 15, wherein the sleeve is elliptical in cross section, and the adjusting cam is a cylindrical disc.

18. The vacuum suction base as described in claim 1, wherein the number of the at least one bulge is two, the two bulges are allocated at the middle of the bottom wall symmetrically, and the recesses are uniformly arranged along a circumference of a circle.

* * * * *